(12) United States Patent
Macintosh et al.

(10) Patent No.: US 11,934,378 B2
(45) Date of Patent: Mar. 19, 2024

(54) RECORDING CHANGES TO RECORDS WHILST PRESERVING RECORD IMMUTABILITY

(71) Applicant: International Business Machines Corporation, Armonk, NY (US)

(72) Inventors: Fraser Iain Macintosh, Reading (GB); Rosanna Lickorish, Southampton (GB); Mark Longland, Old Windsor (GB)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 17/198,344

(22) Filed: Mar. 11, 2021

(65) Prior Publication Data

US 2022/0292073 A1   Sep. 15, 2022

(51) Int. Cl.
*G06F 16/23* (2019.01)
*G06F 16/21* (2019.01)

(52) U.S. Cl.
CPC ........ *G06F 16/2365* (2019.01); *G06F 16/211* (2019.01)

(58) Field of Classification Search
CPC ............................ G06F 16/2365; G06F 16/211
See application file for complete search history.

(56) References Cited

U.S. PATENT DOCUMENTS

| 5,133,075 A * | 7/1992 | Risch | G06F 16/2358 |
| | | | 706/53 |
| 5,974,425 A * | 10/1999 | Obermarck | G06F 11/1471 |
| | | | 714/E11.13 |
| 6,687,699 B1 * | 2/2004 | Courey, Jr. | G06F 16/9024 |

(Continued)

FOREIGN PATENT DOCUMENTS

| CN | 101030225 A | 9/2007 |
| CN | 104461862 A | 3/2015 |
| CN | 111966701 A | 11/2020 |

OTHER PUBLICATIONS

Chacon et al., "Pro Git", Version 2.1.277, Dec. 1, 2020, apress, 521 pps., <https://git-scm.com/book/en/v2#Snapshots,-Not-Differences>.

(Continued)

*Primary Examiner* — Taelor Kim
(74) *Attorney, Agent, or Firm* — David K. Mattheis

(57) ABSTRACT

Aspects of the present invention disclose a method, computer program product, and system for recording changes to records whilst preserving record availability. The method includes one or more processors capturing a change to a record object. The changes include details of the record object to be changed and a change method instruction by which the object is to be changed. The method further includes one or more processors storing a change object as a standalone object and storing the change method instruction and metadata pointing to the record object. The method further includes one or more processors modifying metadata of previous versions of the record object to include a pointer to the change object. The method further includes one or more processors applying the change method instruction to the record object when responding to a retrieve or restore request for the record object.

20 Claims, 10 Drawing Sheets

(56) References Cited

U.S. PATENT DOCUMENTS

| | | | |
|---|---|---|---|
| 7,533,134 B2* | 5/2009 | Terry | G06F 16/273 |
| | | | 707/999.203 |
| 7,752,401 B2 | 7/2010 | Merrick et al. | |
| 8,234,317 B1 | 7/2012 | Pogde | |
| 10,664,361 B1 | 5/2020 | Carr | |
| 2003/0208490 A1* | 11/2003 | Larrea | G06F 16/252 |
| | | | 707/999.009 |
| 2009/0094245 A1 | 4/2009 | Kerns | |
| 2015/0039990 A1 | 2/2015 | Tecu | |
| 2015/0317328 A1 | 11/2015 | Chhaunker et al. | |
| 2016/0171025 A1* | 6/2016 | Ji | G06F 16/235 |
| | | | 707/747 |
| 2018/0373604 A1* | 12/2018 | Martin | G06F 16/219 |
| 2019/0102256 A1 | 4/2019 | Murphy | |
| 2019/0370121 A1 | 12/2019 | Ramachandran | |

OTHER PUBLICATIONS

Mell et al., "The NIST Definition of Cloud Computing", National Institute of Standards and Technology, U.S. Department of Commerce, NIST Special Publication 800-145, Sep. 2011, 7 pages.

International Search Report and Written Opinion dated May 17, 2022 from International Patent Application No. PCT/CN2022/077022 filed Feb. 21, 2022.

\* cited by examiner

RECORDING CHANGES TO RECORDS WHILST PRESERVING RECORD IMMUTABILITY

BACKGROUND OF THE INVENTION

The present invention relates generally to the field of maintaining backup and archive records, and more particularly to recording changes to records whilst preserving record immutability.

Many regulatory systems require data to be stored in an immutable manner, that is to assure that no changes have been made to the data whilst stored. Regulatory schemes as well as user requirements for best practice require immutable storage (e.g., by industries such as financial services, telecoms, legal, etc.). It is common to require change, deletion, or correction requests to be made for data which are stored. An example would be the right to be forgotten or right to have personal data corrected under the General Data Protection Regulation (GDPR) under European Union law. Further, data storage systems are required to provide assurance that the data committed to a system are the same when the data are retrieved from the system.

SUMMARY

Aspects of the present invention disclose a method, computer program product, and system for recording changes to records whilst preserving record availability. The method includes one or more processors capturing a change to a record object. The changes include details of the record object to be changed and a change method instruction by which the object is to be changed. The method further includes one or more processors storing a change object as a standalone object and storing the change method instruction and metadata pointing to the record object. The method further includes one or more processors modifying metadata of previous versions of the record object to include a pointer to the change object. The method further includes one or more processors applying the change method instruction to the record object when responding to a retrieve or restore request for the record object.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

Embodiments of the present invention will now be described, by way of example only, with reference to the following drawings.

Figure 1:
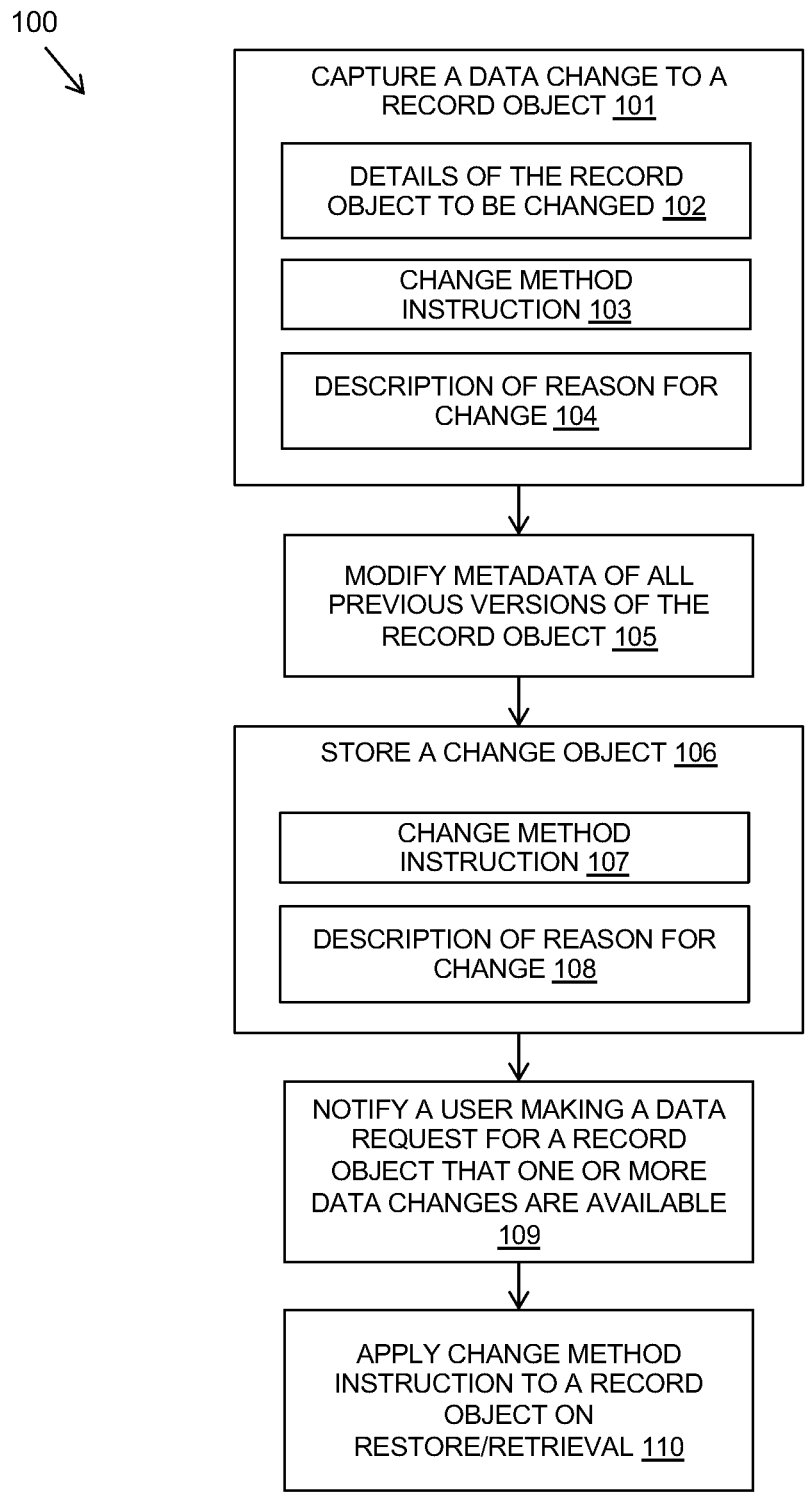

FIG. 1 is a flow diagram of an example embodiment of a method, in accordance with embodiments of the present invention.

Figure 2:
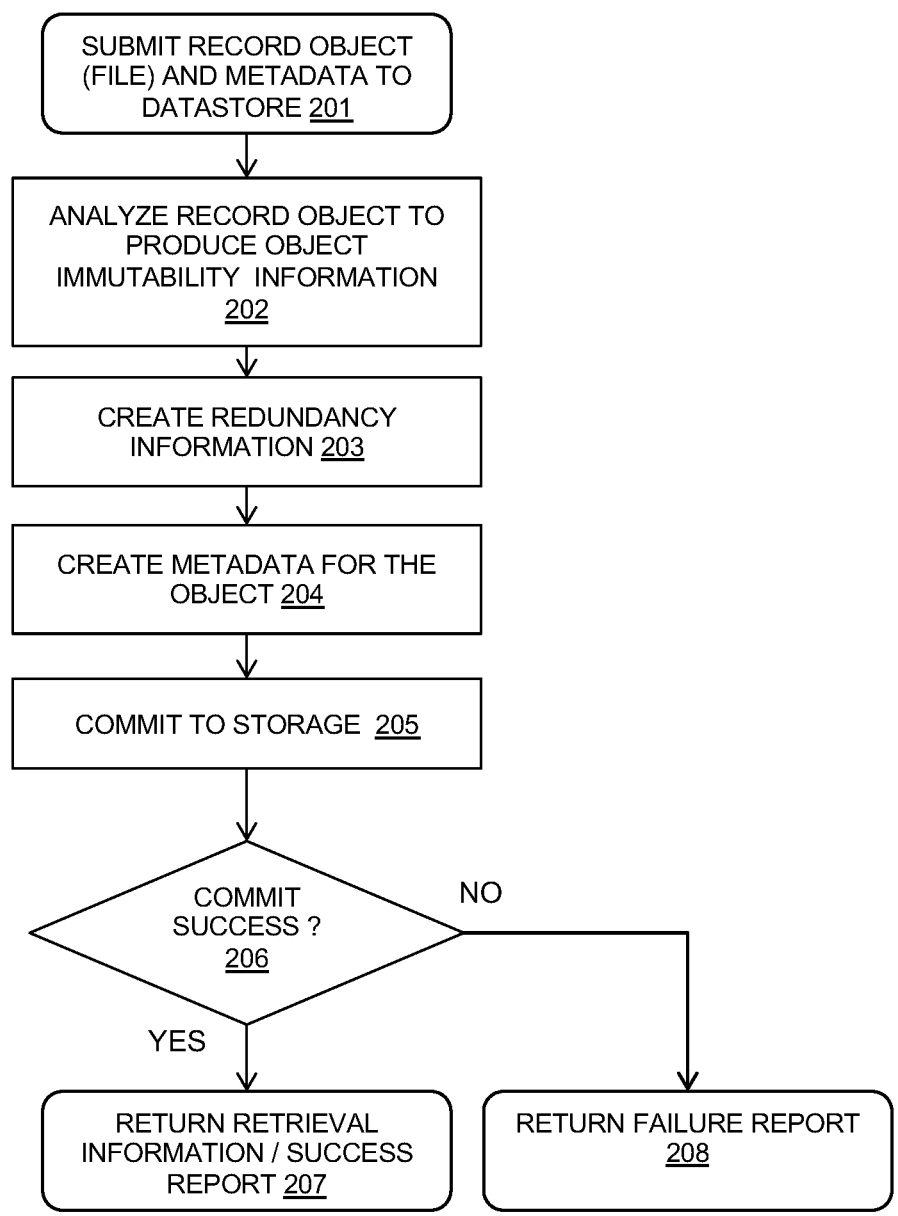

FIG. 2 is a flow diagram of an example embodiment of a commit object flow as an aspect of a method, in accordance with embodiments of the present invention.

Figure 3:
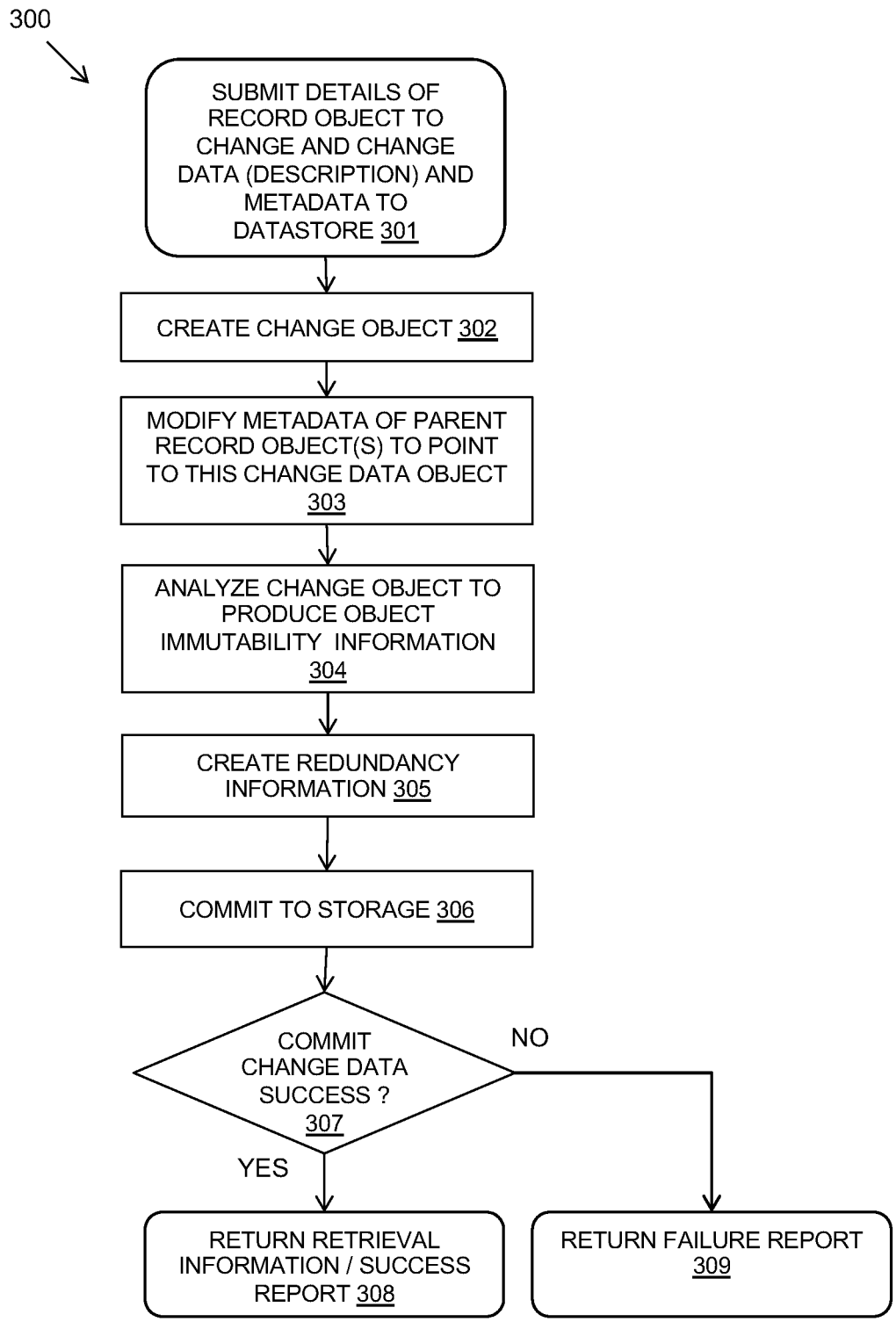

FIG. 3 is a flow diagram of an example embodiment of a modify object flow as an aspect of a method, in accordance with embodiments of the present invention.

Figure 4:
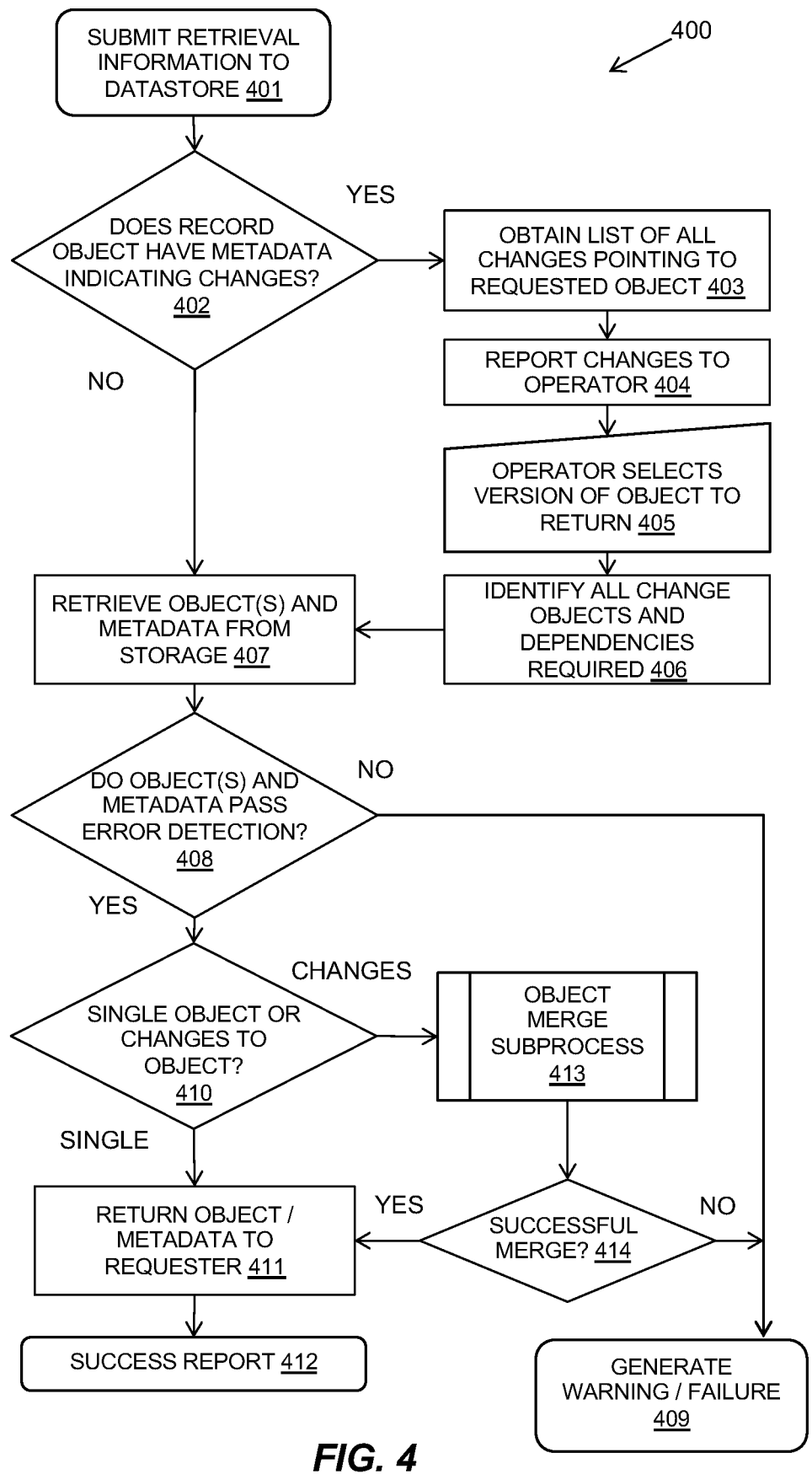

FIG. 4 is a flow diagram of an example embodiment of a retrieve or restore object flow as an aspect of a method, in accordance with embodiments of the present invention. in accordance with the present invention.

Figure 5:
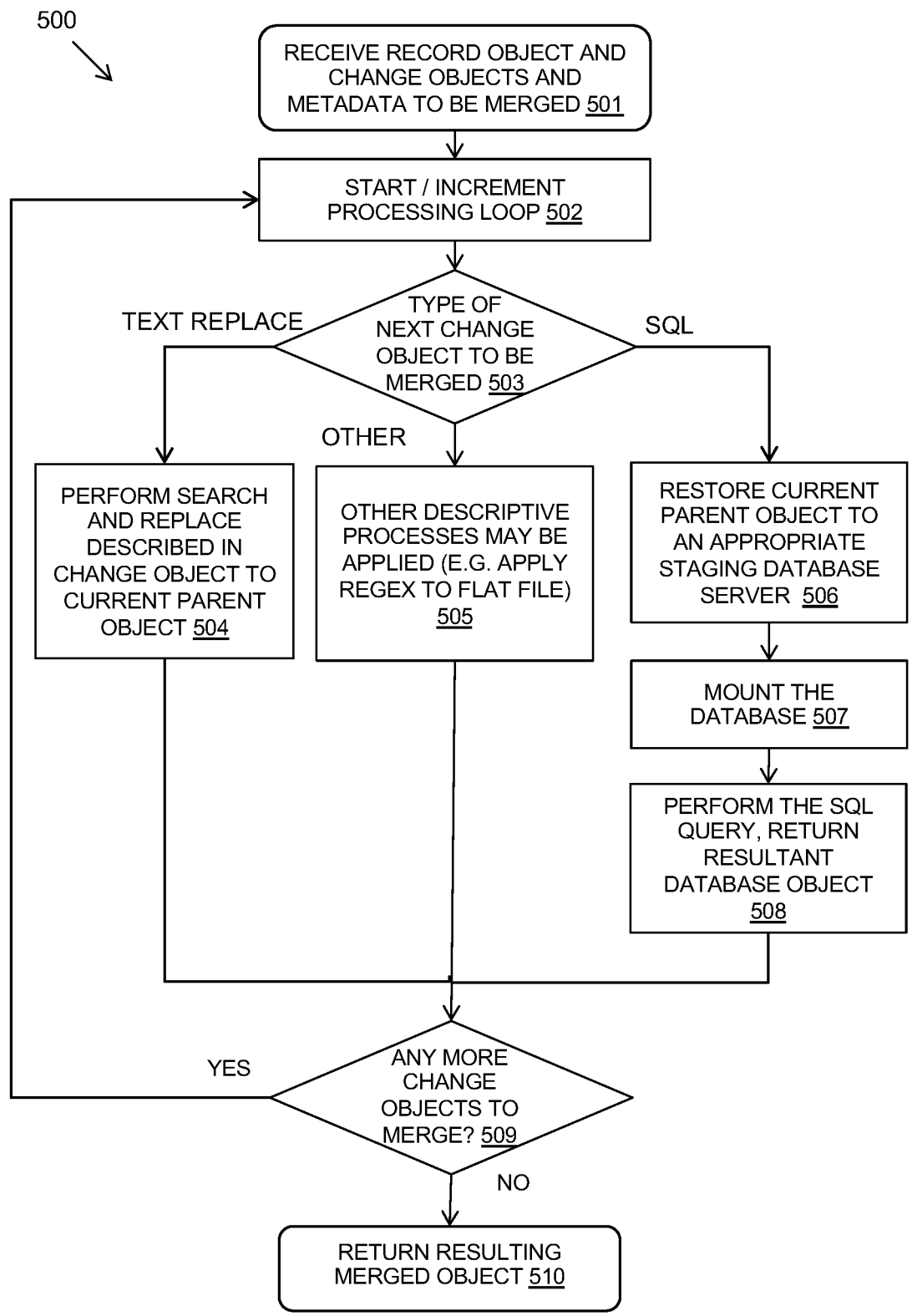

FIG. 5 is a flow diagram of an example embodiment of an object merge flow as an aspect of a method, in accordance with embodiments of the present invention.

Figure 6:
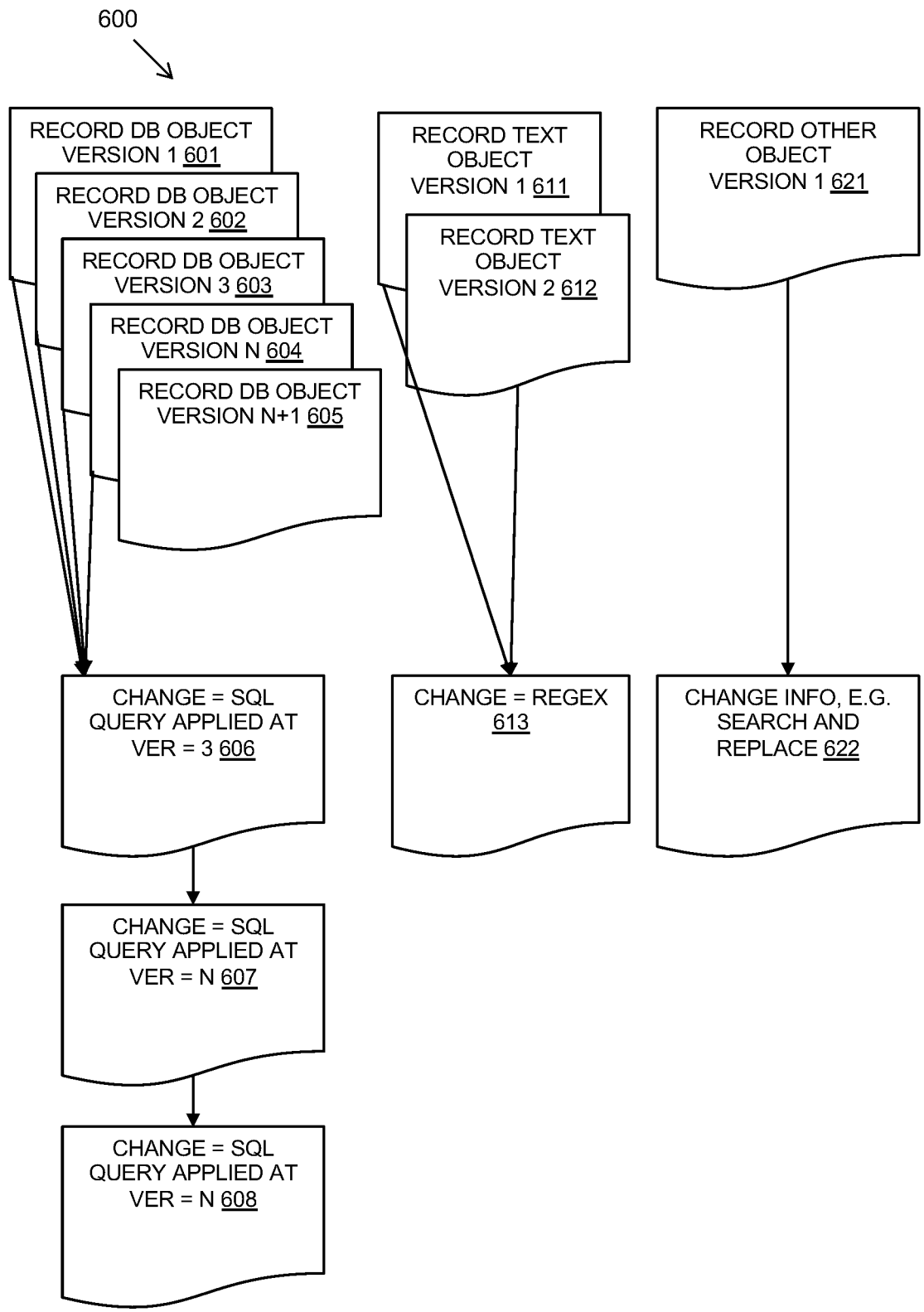

FIG. 6 is a schematic diagram of an example embodiment of data objects illustrating an aspect of a method, in accordance with embodiments of the present invention.

Figure 7:
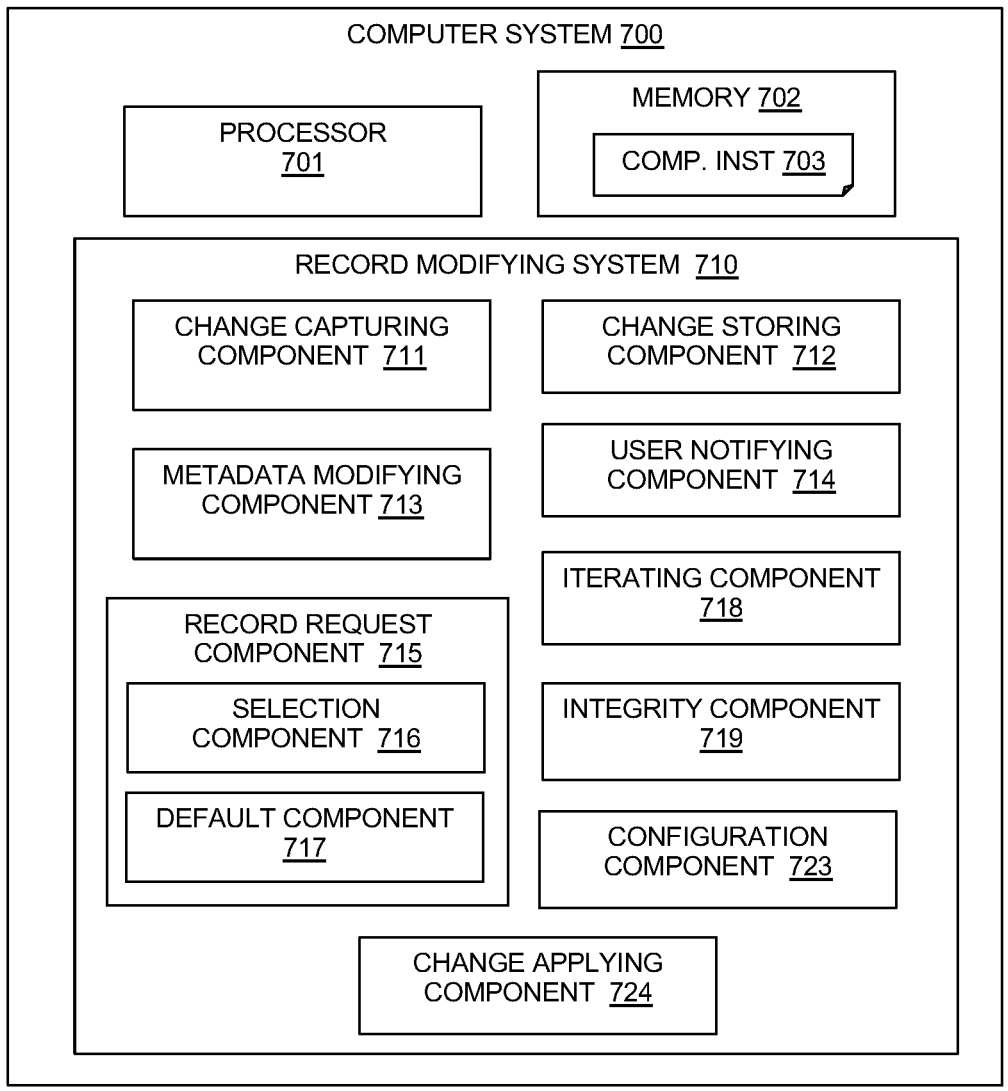
Figure 7:
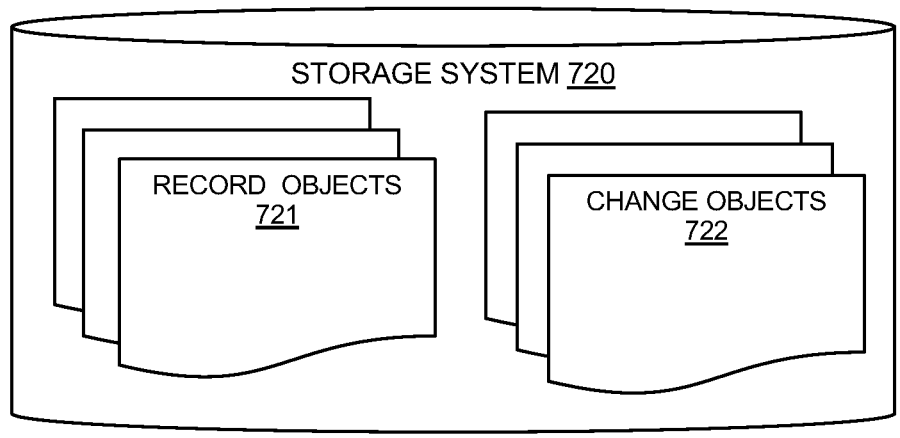

FIG. 7 is block diagram of an example embodiment of a system, in accordance with embodiments of the present invention.

Figure 8:
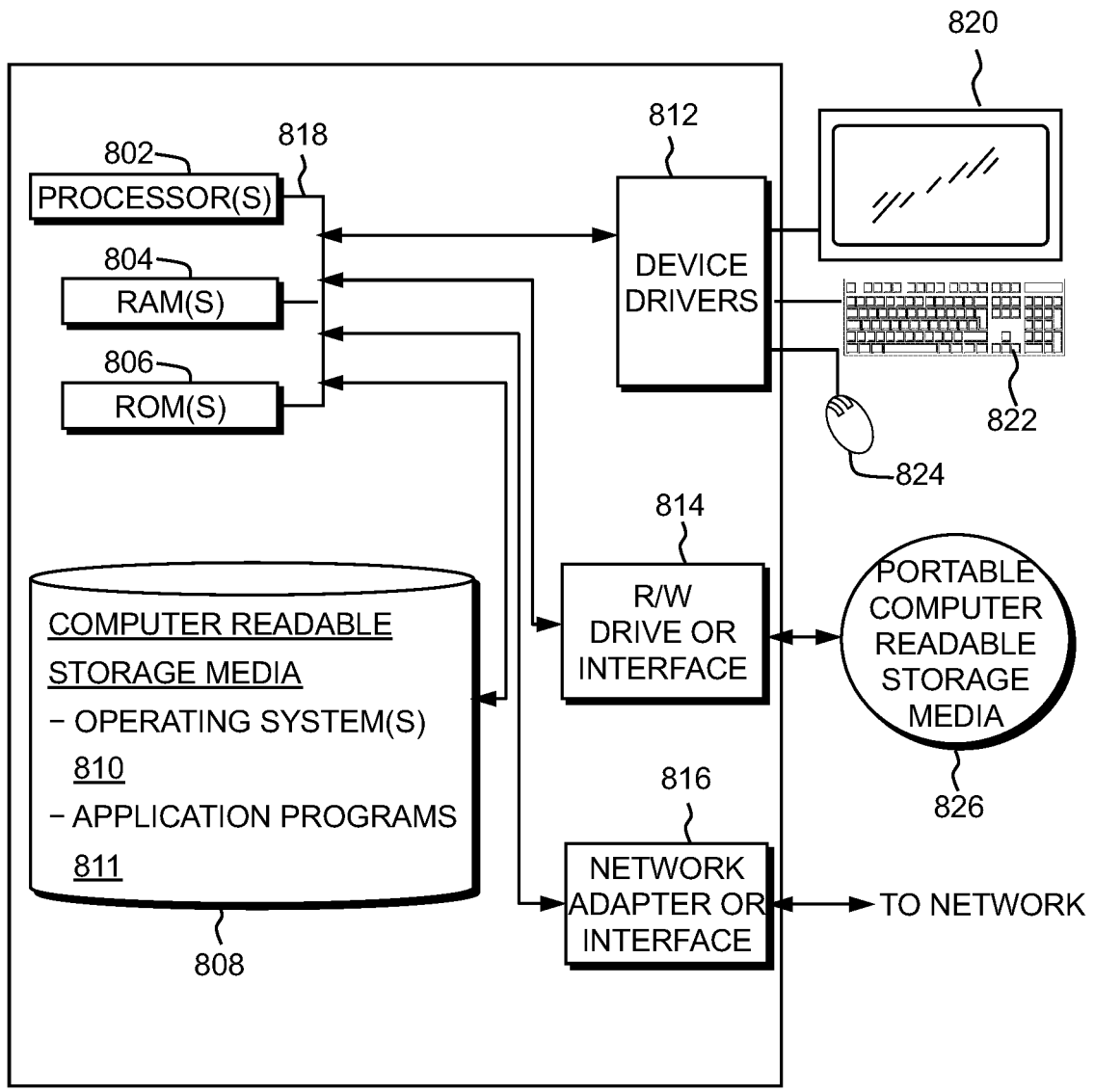

FIG. 8 is a block diagram of an embodiment of a computer system or cloud server in which the present invention may be implemented, in accordance with embodiments of the present invention.

Figure 9:
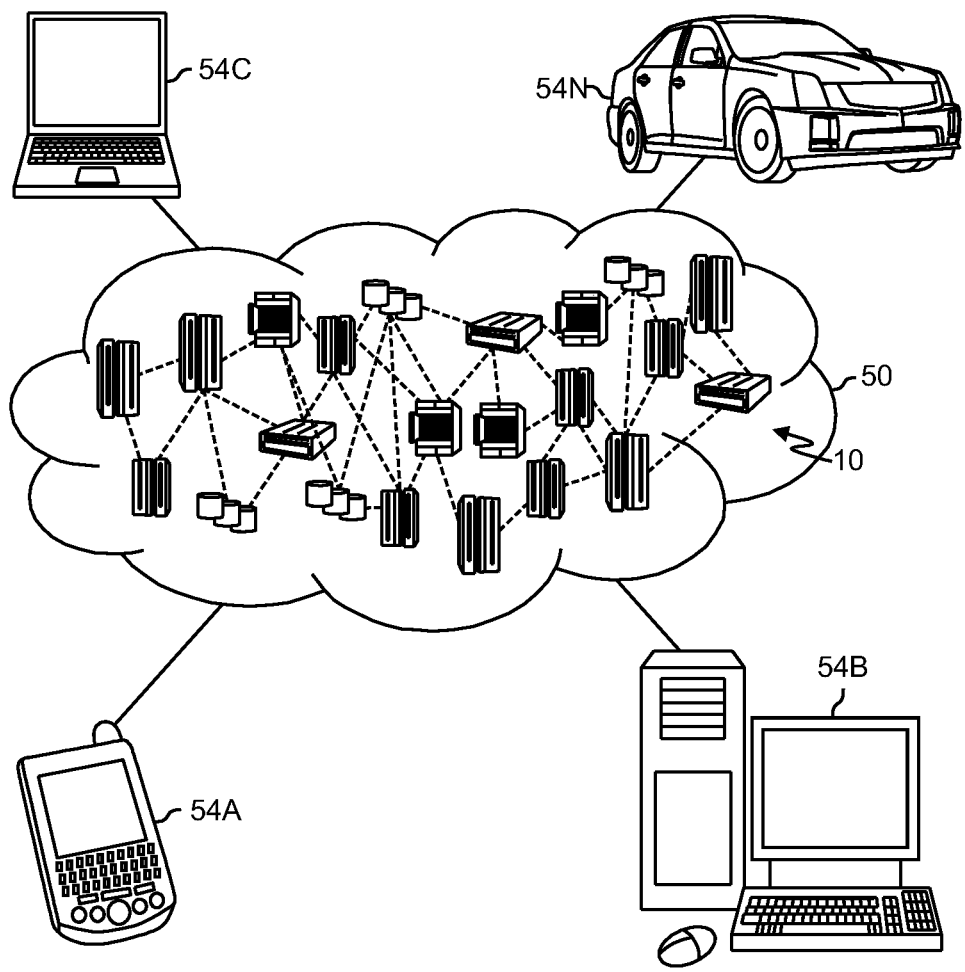

FIG. 9 is a schematic diagram of a cloud computing environment in which the present invention may be implemented, in accordance with embodiments of the present invention.

Figure 10:
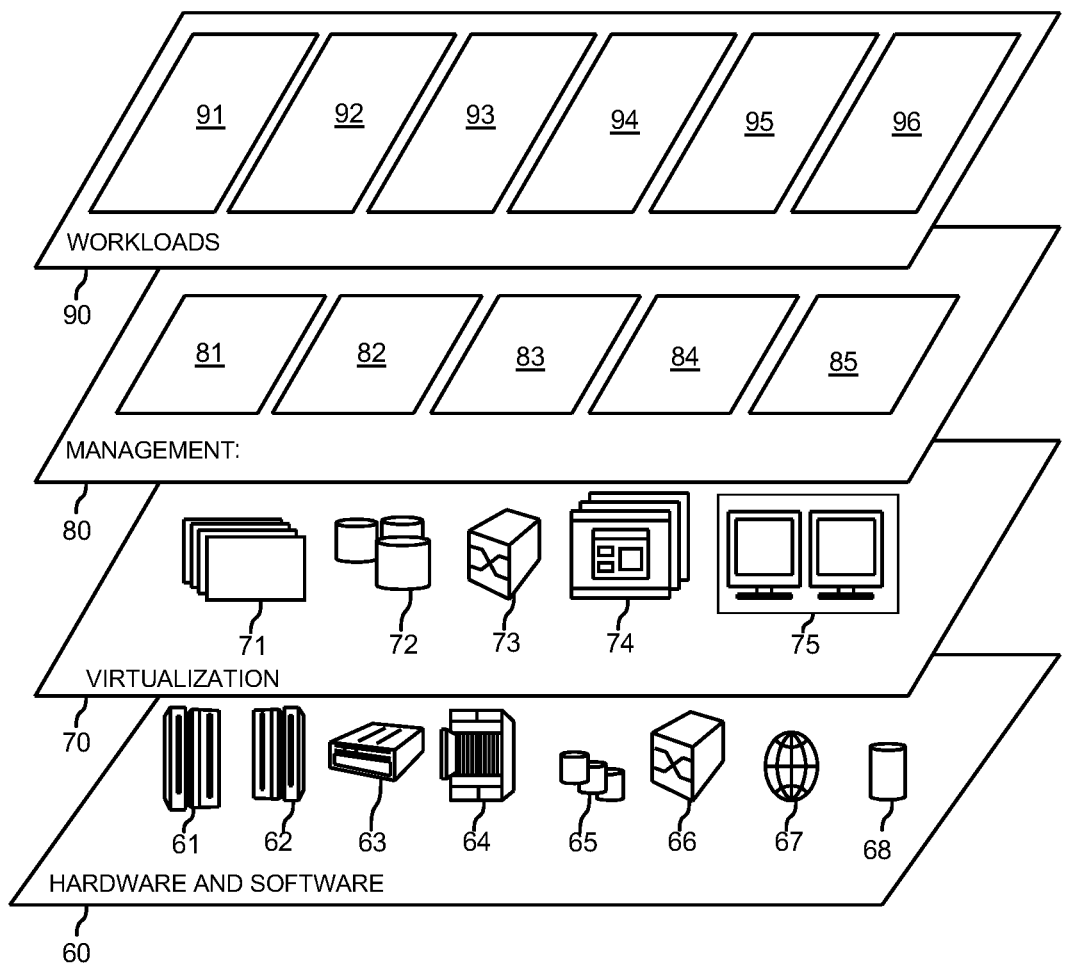

FIG. 10 is a diagram of abstraction model layers of a cloud computing environment in which the present invention may be implemented, in accordance with embodiments of the present invention.

DETAILED DESCRIPTION

Embodiments of the present invention recognize that the requirement to store data immutably and also to provide changes can bring archive or backup data storage systems into conflict with regulations. Data storage systems are required to provide assurance that the data committed to a system are the same when the data are retrieved from the system. Currently, such changes can be provided by either wholesale deletion of stored data records or by making a note of changes made to online or production systems and providing a manual process to detail changes to be made when restoring and/or retrieving from backup or archival systems. Embodiments of the present invention recognize that the process is open to failures and can have little assurance that the changes are captured correctly or stored without accidental or deliberate modification.

In a traditional scenario, changes to stored data would be made by restoring the initially committed data, making the change and then re-backing up/archiving it. However, embodiments of the present invention recognize that such a process breaks the chain of assurance that the object has not been changed' and therefore, cannot be described as immutable as there is no assurance as to exactly what changes have been made. In addition, storing the changed object separately alongside the pre-existing object can significantly degrade storage efficiency and complicate the restore/retrieve process by making the process very easy to select the wrong object. Embodiments of the present invention further recognize that it is also not possible to apply changes to pre-existing versions of objects without risking the integrity of the whole backup/archive system, as no commercial implementations support this, so such a process would need to be implemented on an ad-hoc bespoke basis or by manual process, both of which are open to process failure.

Embodiments of the present invention operate to provide a method and system that enables changes of a record, such as a backup or archive record, without compromising data immutability and allowing the changes to be captured separately within a storage repository alongside descriptions of reasons for the changes. Details of a change or a series of interdependent changes to a record are stored and the changes are applied at a time at which the record is retrieved or restored. Further embodiments of the present invention can alert a user or system making a restore or retrieve request to the presence of applicable changes.

Additional embodiments of the present invention can provide the ability to record changes to archival systems and to apply these changes to earlier versions of the objects stored within the archive, which means that versions of an object may be tracked over time and dependencies of changes applied to the object. Changes may be made for regulatory compliance and applied on objects stored prior to the change having been made, which allows deletions/modifications to data as required by legislation and avoiding an application specific handling.

Various aspects of embodiments of the present invention operate to build on existing archive and backup storage systems' immutability features, whilst allowing changes to be captured separately within the system alongside descriptions of the reason for the change. Further, embodiments of the present invention (as described in more detail below) return updated records, whilst preserving the immutable nature of the objects, which allows the return of a compliant version of the data stored.

Referring to FIG. 1, a flow diagram 100 depicts an example embodiment of an overview of the described method. For the purpose of explanation, the process depicted in flow diagram 100 (described in FIG. 1) may be implemented in one or more of the diagrams and systems depicted in the system illustrated in FIG. 7 (e.g., computer system 700). In an example embodiment, one or more components of computer system 700, such as record monitoring system 710 (and included components), can perform the processing steps of flow diagram 100. Alternatively, execution of flow diagram 100 is not limited to this implementation. In various embodiments, the method of flow diagram 100 is applied to record storage in which record objects are stored that are never changed, which maintains the immutability.

In process 101, the method of flow diagram 100 captures a change to a record object including: details of the record object to be changed (step 102); a change method instruction by which the record object is changed (step 103); and a description of the reason for the change (step 104). In step 105, the method of flow diagram 100 modifies metadata of all previous versions of the record object identified in the captured change to include information about the change.

In process 106, the method of flow diagram 100 stores a change object as a standalone object including the change method instruction (step 107) and the description of the reason for the change (step 108). In a further aspect, the method of flow diagram 100 can store the change object separately, also immutably (in process 106). In example embodiments, the information stored for representation of the change made is the method by which the change is made (for example, a Structured Query Language (SQL) Statement, a Text Replace, a Regular Expression (REGEX), etc.) and not the results of the changes that have been made (block storage delta, database log, etc.).

In step 109, the method of flow diagram 100 includes notifying a user making a data request for an object that one or more changes are available to be applied when retrieving or restoring the object. A retrieve or restore process for a record object may then reference one or more change objects associated with the record object and, in step 110, the method of flow diagram 100 can apply the one or more change method instructions to the record object to make the changes as required. Configuration may also force changes, allow both record objects and change objects to be restored separately, or merged. In example embodiments, the changes that are applied may be configured to be selected by a user or to default to be applied automatically.

Accordingly, the original object is stored unchanged, and later versions may also be stored, together with change objects that explain the changes that are applicable to the original object and any later versions of the object. The method stores initial data unchanged and stores details of a single change or a series of interdependent changes that are required to be made at restore/retrieve time. The changes can therefore point to versions of the initial object prior to the change being made and on different software versions or hardware platforms.

Once captured, it should not be possible to bring data which are not in regulatory compliance back into online or production systems; however, the integrity of that data can be assured throughout the time it is stored. This removes the conflict of the requirement to store data in an unchangeable manner, while also requiring that the stored data can be changed or deleted under certain regulatory systems.

In various embodiments, no changes are made to the initial record object until the record is restored and the integrity has been checked. Instead, changes which are to be made are stored as a description of the process to make the change, such as a SQL Statement to run on a restored database, a text find and replace string, a REGEX, etc. Alongside the changes are stored metadata describing the reason the changes were made. The changes are able to point to versions of the stored object prior to the time at which the changes were made and stored from different hardware or software instances of the source system.

Various aspects of the present invention can operate to support multiple different changes which may be interdependent upon each other to allow for multiple changes to a single object over time (i.e., the multiple different stored versions of the object).

In an example embodiment, the primary stored object does not undergo a change; however, changes can be made on retrieval or restore of the object. At this point the unchanged object can be obtained and automatically have the changes applied to make the data compliant, before being moved into a system allowing general access.

There are three broad processes which are described, that for committing an initial object, committing a modification to that object, and retrieving the object and merging any applicable changes. FIG. 2 shows a flow diagram 200 of an example commit object flow. FIG. 3 shows a flow diagram 300 of an example modify object flow. FIG. 4 shows a flow diagram 400 of an example retrieve/restore object flow. FIG. 5 additionally shows a flow diagram 500 of an object merge subprocess flow used in the flow diagram 400 of the retrieve/restore object flow.

Referring to FIG. 2, the flow diagram 200 depicts an example commit object flow, in accordance with embodiments of the present invention. For the purpose of explanation, the process depicted in flow diagram 200 (described in FIG. 2) may be implemented in one or more of the diagrams and systems depicted in the system illustrated in FIG. 7 (e.g., computer system 700). In an example embodiment, one or more components of computer system 700, such as record monitoring system 710 (and included components), can perform the processing steps of flow diagram 200. Alternatively, execution of flow diagram 200 is not limited to this implementation.

The method of flow diagram 200 starts with step 201, which includes submitting a record object (such as a file) together with corresponding metadata to a datastore (such as a database archive). In step 202, the method of flow diagram 200 includes analyzing the submitted record object to produce information to validate the immutability of the record object. For example, the analysis may produce a checksum to validate if the record object has changed. In step 203, the method of flow diagram 200 can (optionally) include creating redundancy information to ensure the file is successfully stored. For example, creating redundancy information can include Redundant Array of Inexpensive Disks (RAID), erasure coding, or deduplication information, if not created by the storage system, etc.

In step 204, the method of flow diagram 200 includes creating metadata for the record object and may produce information to validate the metadata and, in step 205, may commit the record object and the metadata to storage. For example, the storage may be tape, disk, object, database, etc.

In decision step 206, the method of flow diagram 200 determines whether the commit is a success. In response to determining that the commit is a success (decision step 206, YES branch), the method of flow diagram 200 includes returning the retrieval information with a success report (step 207). In response to determining that the commit is not a success (decision step 206, NO branch), the method of flow diagram 200 includes returning a failure report (in step 208).

Referring to FIG. 3, the flow diagram 300 depicts an example modify object flow, in accordance with embodiments of the present invention. For the purpose of explanation, the process depicted in flow diagram 300 (described in FIG. 3) may be implemented in one or more of the diagrams and systems depicted in the system illustrated in FIG. 7 (e.g., computer system 700). In an example embodiment, one or more components of computer system 700, such as record monitoring system 710 (and included components), can perform the processing steps of flow diagram 300. Alternatively, execution of flow diagram 300 is not limited to this implementation.

The method of flow diagram 300 starts with step 301, which includes submitting details of a record object (such as a file) to change and change data together with corresponding metadata. In step 302, the method of flow diagram 300 includes creating a change object. In example embodiments, the change object includes a change method instruction by which the record object is changed (for example, SQL statement, REGEX, etc.) and a description of the reason for the change. In step 303, the method of flow diagram 300 can include modifying metadata of record objects of all previous versions of the original record object to include information about the change existing and to point to the new change object.

In step 304, the method of flow diagram 300 can include analyzing the submitted change object to produce information to validate the immutability of the change object. For example, the analysis may produce a checksum to validate if the change object has changed. In step 305, the method of flow diagram 300 (optionally) includes creating redundancy information to ensure the change object is successfully stored.

In step 306, the method of flow diagram 300 can commit the change object to storage and the method of flow diagram 300 can determine whether the commit is a success (in decision step 307). In response to determining that the commit is a success (decision step 307, YES branch), the method of flow diagram 300 returns the retrieval information is returned with a success report (in step 308). In response to determining that the commit is not a success (decision step 307, NO branch), the method of flow diagram 300 returns a failure report (in step 309).

Referring to FIG. 4, the flow diagram 400 depicts an example retrieve record object flow, in accordance with embodiments of the present invention. For the purpose of explanation, the process depicted in flow diagram 400 (described in FIG. 4) may be implemented in one or more of the diagrams and systems depicted in the system illustrated in FIG. 7 (e.g., computer system 700). In an example embodiment, one or more components of computer system 700, such as record monitoring system 710 (and included components), can perform the processing steps of flow diagram 400. Alternatively, execution of flow diagram 400 is not limited to this implementation.

The method of flow diagram 400 starts with step 401, which includes submitting retrieval information to a datastore for a record object (such as an API call for a file). In additional aspects, embodiments of the present invention can execute an equivalent method for restoring a record object.

In decision step 402, the method of flow diagram 400 determines whether the record object to be retrieved/restored has metadata indicating that changes exist. In response to determining that the metadata indicates that changes exist (decision step 402, YES branch), the method of flow diagram 400 obtains a list of all changes pointing to the requested record object (in step 403) and the method of flow diagram 400 can report the changes to an operator (in step 404). In step 405, the method of flow diagram 400 can facilitate selection (via an operator) of a version of the record object to return. Then, in step 406, the method of flow diagram 400 can identify all change objects and dependencies required. In response to determining that the metadata does not indicate changes (decision step 402, NO branch), the method of flow diagram 400 retrieves the object(s) (the record object and any change objects) and respective metadata from the storage system (in step 407). For example, the method of flow diagram 400 can identify an absence of changes in the metadata, or determine that the metadata indicates that the change objects have been identified.

In decision step 408, the method of flow diagram 400 determines whether the object(s) and metadata pass error detection. In response to determining that the error detection does not pass (decision step 408, NO branch), the method of flow diagram 400 generates a warning/failure (in step 409).

In response to determining that the error detection does pass (decision step 408, YES branch), the method of flow diagram 400 determines whether the object is a single record object or if the object includes one or more changes to the record object (decision step 410). In response to determining a single record object (decision step 410, SINGLE branch), the method of flow diagram 400 returns the record object and metadata to the requester (step 411) and provides a success report (step 412). However, in response to determining changes to the record object (decision step 410, CHANGES branch), the method of flow diagram 400 performs an object merge subprocess (step 413). In various embodiments, the object merge subprocess is carried out as described in the flow diagram 500 of FIG. 5 to apply changes to the initial record object.

In decision step 414, the method of flow diagram 400 determines whether the merge is successful. In response to determining that the merge is successful (decision step 414, YES branch), the method of flow diagram 400 returns the resultant merged object and metadata to the requester (step 411) and provides a success report (step 412). In response to determining that the merge is not successful (decision step 414, NO branch), the method of flow diagram 400 generates a warning/failure (in step 409).

Referring to FIG. 5, the flow diagram 500 depicts an example object merge subprocess (as indicated above in step 413), in accordance with embodiments of the present invention. For the purpose of explanation, the process depicted in flow diagram 500 (described in FIG. 5) may be implemented in one or more of the diagrams and systems depicted in the system illustrated in FIG. 7 (e.g., computer system 700). In an example embodiment, one or more components of computer system 700, such as record monitoring system 710 (and included components), can perform the processing steps of flow diagram 500. Alternatively, execution of flow diagram 500 is not limited to this implementation.

The method of flow diagram 500 starts with step 501, which includes receiving a record object and one or more change objects and metadata to be merged. In another aspects, the method of flow diagram 500 can initiate through incrementing the processing loop (step 502).

In decision step 503, the method of flow diagram 500 determines a type of a next change object to be merged. In example embodiments, the types of text replace, SQL, or other processes are considered. In response to determining a text replace change (decision step 503 TEXT REPLACE branch), the method of flow diagram 500 performs the search and replace described in the change object to the record object (in step 504). In response to determining that the change is associated with an SQL statement, the method of flow diagram 500 restores a current record object to an appropriate staging database server, mounts the database (in step 507), and then can perform the SQL query and return the resultant database object (in step 508). In response to determining that the change is associated with other processes, the method of flow diagram 500 can apply other descriptive processes, for example, to apply a REGEX to a flat file (in step 508).

Then, in decision step 509, the method of flow diagram 500 determines whether any more changes are available for objects to merge. In response to determining that more changes do exist (decision step 509, YES branch), the method of flow diagram 500 can loop to increment the processing loop (step 502). In response to determining that more changes do exist (decision step 509, NO branch), the method of flow diagram 500 can return the resulting merged object (step 510).

Referring to FIG. 6, a schematic diagram 600 illustrates an example of the described method. Several record objects (e.g., record database (db) object version 1 601, record db object version 2 602, record db object version 3 603, record db object version n 604, record db object version n+1 605, record text object version 1 611, record text object version 1 612, and record other object version 1 621) are shown with respective change objects. For example, change object 606, change object 607, change object 608, change object 613, and change object 622.

In the depicted example, a primary database record object 601-605 is stored with versions 1 601, 2 602, 3 603, N 604, and N+1 605. Three change objects 606, 607, 608 are stored. A first change object 606 is for an SQL query applied at version 3, a second change object 607 is for an SQL query applied at version n, and a third change object 608 is an SQL query applied at version n.

A primary text object is also shown with two versions 611, 612 and a linked change object 613 to apply a REGEX. A primary other object 621 is also shown and a linked change object 622 to change information, for example, with a search and replace.

In various embodiments, the record objects may have metadata including pointers to applicable change objects and pointer to other versions of the same record object. The change objects may have metadata including pointers to dependent change objects and dependent record objects.

Dependent change objects are different versions of the same record object. For example, where the same record object is backed up for a number of different versions to protect against deletion or corruption or where periodic archival of the same record object is required for regulatory compliance. All different versions of the record file would be able to have the same change object applied to them at the point of restore.

Change objects may also point to other change objects to allow for multiple different changes to data over time, while allowing the objects to be processed in order, while also being able to demonstrate if a change object stands alone, or dependent on others.

In the example of FIG. 6, the first change described in the first change object 606 is for a change at version 3 of the record object 603 and would not need to be applied to later versions 604, 605. The two change objects 607, 608 to be applied at version n would need to be applied to all previous versions of the record object 601, 602, 603, 604. The record object n+1 605 is from a point in time after the other changes have been applied to the data source so no changes would need to be applied upon the restoration of this object.

Accordingly, a change can be made after an object has been stored in the archive/backup system and be linked to any previous versions of the object stored. Recording of the point at which the change was made to the data source allows the archive/backup system to know which changes could be needed to be made.

The follow describes an example of object metadata of the record objects and change objects:
Object Type: {Record I Change}
Object Data Type: Database (DB) image/backup, filesystem, Binary Large Object
 (BLOB), Text file, flat files, other;
 SQL Statement, search and replace details, REGEX, other.
Source Data (app type, app version, filesystem details, OS, architecture, etc.)
Checksum to assure object has not been changed.
Record object:
Pointers to applicable change objects;
Pointers to other versions of the same record object (backup/archive versions, etc.).
Change object:
Pointers to dependent change objects and record object(s);
Change Description (freeform as required by user).
The following describes the object data of a record object and a change object:
Record object: DB image/backup, filesystem, BLOB, Text file, flat files, other;
Change Object: SQL Statement, search and replace details, REGEX, other.

A record object may have:
object data: DB image/backup, filesystem, BLOB, Text file, flat files, other.
object metadata: Object Data Type: DB image/backup, filesystem, BLOB, Text file, flat files, other;
  Source Data (app type, app version, filesystem details, OS, architecture, etc.);
  Checksum to assure object has not been changed;
  Pointers to applicable change objects;
  Pointers to other versions of the same record object (backup/archive versions, etc.);
A change object may have:
object data: SQL Statement, search and replace details, REGEX, other.
object metadata: Object Data Type: SQL Statement, search and replace details, REGEX, other;
  Source Data (app type, app version, filesystem details, OS, architecture, etc.);
  Checksum to assure object has not been changed;
  Pointers to dependent change objects and record object(s); Change Description (freeform as required by user)

The described method and system use a change method instruction to provide details of the change made, such as a SQL statement. The method instruction of the change made is very small and can be applied without a large series of sequentially dependent data logs and can be stored efficiently and be applied across different versions of a database application, architecture, or filesystem.

The implementation differs to a database transaction log, which stores the binary differential result of the changes a transaction has made to the main database. The reason database transaction logs are used is so that failure of the system after the previous backup can be restored from, with the previous backup and the subsequent logs to any point in time up to the failure. Logs can also assist in migrating database change to replication target servers for reasons of high availability and disaster recovery. Database logs can grow significantly large due to their binary nature, if not periodically cleared down.

A database transaction log can only be played back in order and cannot be applied to different instances of the same system, which is the case with the described method. With the described method, a single change can be applied in isolation.

Similarly, the above advantages of the described method are not found in a filesystem snapshot, which are broadly similar to database logs, however they are application independent. Typically, a snapshot is a point in time, described as a binary bitmap representing the changes made to the filesystem since the point in time at which the snapshot was taken. All changed data (blocks/tracks) are required to build a valid snapshot image.

A codebase repository allows simple progression of changes over time in a broadly similar manner to a filesystem snapshot, or database log. The major difference is that a series of development branches can be created allowing independent changes to be fully developed and merged back into the production version of the codebase for the product being developed. The systems rely on sequential submissions of files, which are either stored in their entirety or represented by the changes from one to another known as "Deltas." If stored in their entirety, changes between each file are computed at the point of comparing files with one another.

Again, the key differences between the described method and a code repository are that the data that are stored in the traditional methods are the results of the changes made, rather than the method by which the change was made (e.g., REGEX, SQL statement, etc.), which makes the storage much less efficient and also means that applying a change out of sync or prior to the change would result in extremely high risk of corruption of the data. Furthermore, embodiments of the present invention recognize the difficulty in applying a change to stored versions of a file/object before the change had been made in the production system.

Referring to FIG. 7, a block diagram depicts an example embodiment of a computer system 700 providing a record modifying system 710 for recording changes to records whilst preserving object immutability, in accordance with embodiments of the present invention. Records may be provided in a storage system 720 including record objects 721 and change objects 722 with pointers provided in metadata of the record objects 721 and the change objects 722 to relate the change objects 722 to the applicable record objects 721 and to other change objects 722, whilst storing both the record objects 721 and the change objects 722 in immutable form.

The computer system 700 includes at least one processor 701, a hardware module, or a circuit for executing the functions of the described components which may be software units executing on the at least one processor. Multiple processors running parallel processing threads may be provided enabling parallel processing of some or all of the functions of the components. Memory 702 may be configured to provide computer instructions 703 to the at least one processor 701 to carry out the functionality of the components.

The record modifying system 710 may include a change capturing component 711 for capturing a change to a record object including: details of the record object to be changed; a change method instruction by which the object is to be changed; and a description of the reason for the change.

The record modifying system 710 may include a change storing component 712 for storing a change object as a standalone object storing the change method instruction, metadata pointing to the record object, and the description of the reason for the change.

The record modifying system 710 may include a metadata modifying component 713 for modifying metadata of all previous versions of the record object to include a pointer to the change object.

The record modifying system 710 may include a user notifying component 714 for notifying a user making a request for a record object that one or more changes to the record object are available.

The record modifying system 710 may include a record request component 715 for receiving a request for a record object and applying a change method instruction of one or more change objects pointed to by the record object. The record request component 715 may include a selection component 716 for receiving a user selection of one or more change objects pointed to by the record object and a default component 717 for applying one or more change objects pointed to by the record object.

The record modifying system 710 may include a change applying component 724 for applying the change method instruction to the record object when responding to a retrieve or restore request for the record object. The record modifying system 710 may include an iterating component 718 for applying one or more change method instructions to the record object by iterating through applicable change method instructions of one or more change objects pointed to by the record object metadata.

The record modifying system 710 may include an integrity component 719 for checking the integrity of a record object and a change object before applying a change method instruction of a change object to the record object.

The record modifying system 710 may include a configuration component 723 for configuring enforced processing of record objects with changes (or changes independently of objects) to apply changes or allow unchanged objects to be returned by configuration at the server side. This may apply to server software and client software to allow for unchanged objects to be returned, if needed, to appropriately authorized operators.

FIG. 8 depicts a block diagram of components of a computing system as used for the computer system 700, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

The computing system can include one or more processors 802, one or more computer-readable RAMs 804, one or more computer-readable ROMs 806, one or more computer readable storage media 808, device drivers 812, read/write drive or interface 814, and network adapter or interface 816, all interconnected over a communications fabric 818. Communications fabric 818 can be implemented with any architecture designed for passing data and/or control information between processors (such as microprocessors, communications and network processors, etc.), system memory, peripheral devices, and any other hardware components within the system.

One or more operating systems 810, and application programs 811, such as the record modifying system 710 are stored on one or more of the computer readable storage media 808 for execution by one or more of the processors 802 via one or more of the respective RAMs 804 (which typically include cache memory). In the illustrated embodiment, each of the computer readable storage media 808 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a RAY drive or interface 814 to read from and write to one or more portable computer readable storage media 826. Application programs 811 on the computing system can be stored on one or more of the portable computer readable storage media 826, read via the respective R/W drive or interface 814 and loaded into the respective computer readable storage media 808.

The computing system can also include a network adapter or interface 816, such as a TCP/IP adapter card or wireless communication adapter. Application programs 811 on the computing system can be downloaded to the computing device from an external computer or external storage device via a network (for example, the Internet, a local area network or other wide area networks or wireless networks) and network adapter or interface 816. From the network adapter or interface 816, the programs may be loaded into the computer readable storage media 808. The network may comprise copper wires, optical fibers, wireless transmission, routers, firewalls, switches, gateway computers and edge servers.

The computing system can also include a display screen 820, a keyboard or keypad 822, and a computer mouse or touchpad 824. Device drivers 812 interface to display screen 820 for imaging, to keyboard or keypad 822, to computer mouse or touchpad 824, and/or to display screen 820 for pressure sensing of alphanumeric character entry and user selections. The device drivers 812, RAY drive or interface 814, and network adapter or interface 816 can comprise hardware and software stored in computer readable storage media 808 and/or ROM 806.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and record object processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method comprising:
    capturing, by one or more processors, a change to a record object, wherein the change includes details of the record object to be changed and a change method instruction by which the record object is to be changed, wherein the record object is immutable;
    storing, by one or more processors, a change object as a standalone object including the change method instruction, a description of a reason for the change, and metadata pointing to the record object;
    modifying, by one or more processors, metadata of all previous versions of the record object to include a pointer to the change object; and
    applying, by one or more processors, the change method instruction to the record object when responding to a retrieve or restore request for the record object.

2. The method as claimed in claim 1:
    wherein capturing a change to a record object further comprises capturing, by one or more processors, a description of a reason for the change; and
    wherein storing the change object as a standalone object further comprises storing, by one or more processors, the description in the change object.

3. The method as claimed in claim 1, further comprising:
    storing, by one or more processors, a series of interdependent change objects to accommodate multiple changes to a record object over time, wherein interdependent change objects include metadata with pointers to dependent change objects.

4. The method as claimed in claim 1, further comprising:
    receiving, by one or more processors, a request for a record object; and
    applying, by one or more processors, one or more change method instructions to the record object by iterating through applicable change method instructions of one or more change objects pointed to by the record object metadata.

5. The method as claimed in claim 1, further comprising:
    receiving, by one or more processors, a request for a record object;
    notifying, by one or more processors, a user making the request that one or more changes to the record object are available; and
    applying, by one or more processors, a change method instruction of one or more change objects pointed to by the record object according to a user selection.

6. The method as claimed in claim 1, further comprising:
    receiving, by one or more processors, a request for a record object; and
    enforcing, by one or more processors, application of change method instructions of one or more change objects pointed to by the record object metadata by default.

7. The method as claimed in claim 1, further comprising:
    checking, by one or more processors, integrity of a record object and a change object before applying a change method instruction of a change object to the record object.

8. The method as claimed in claim 1, further comprising:
    configuring, by one or more processors, processing of a request to access a record object or a change object to allow unchanged record objects to be retrieved or restored by authorized operators.

9. The method as claimed in claim 1, further comprising:
    retrieving, by one or more processors, a record object for a record, wherein retrieving the record object for the record further comprises:
        requesting, by one or more processors, the record object from storage;
        retrieving, by one or more processors, the record object from storage and reading the record object metadata to identify any changes to the record object;
        retrieving, by one or more processors, one or more change objects from storage;
        applying, by one or more processors, one or more change method instructions to the record object as provided in the one or more change objects; and
        returning, by one or more processors, a resultant object from applying the one or more change method instructions to the record object.

10. A computer program product comprising:
    one or more computer readable storage media and program instructions stored on the one or more computer readable storage media, the program instructions comprising:
    program instructions to capture a change to a record object, wherein the change includes details of the record object to be changed and a change method instruction by which the record object is to be changed, wherein the record object is immutable;
    program instructions to store a change object as a standalone object including the change method instruction, a description of a reason for the change, and metadata pointing to the record object;
    program instructions to modify metadata of all previous versions of the record object to include a pointer to the change object; and
    program instructions to apply the change method instruction to the record object when responding to a retrieve or restore request for the record object.

11. The computer program product of claim 10:
    wherein program instructions to capture a change to a record object further comprise program instructions to capture a description of a reason for the change; and
    wherein program instructions to store the change object as a standalone object further comprise program instructions to store the description in the change object.

12. The computer program product of claim 10, further comprising program instructions, stored on the one or more computer readable storage media, to:
    store a series of interdependent change objects to accommodate multiple changes to a record object over time, wherein interdependent change objects include metadata with pointers to dependent change objects.

13. The computer program product of claim 10, further comprising program instructions, stored on the one or more computer readable storage media, to:
receive a request for a record object; and
apply one or more change method instructions to the record object by iterating through applicable change method instructions of one or more change objects pointed to by the record object metadata.

14. The computer program product of claim 10, further comprising program instructions, stored on the one or more computer readable storage media, to:
receive a request for a record object;
notify a user making the request that one or more changes to the record object are available; and
apply a change method instruction of one or more change objects pointed to by the record object according to a user selection.

15. A computer system comprising:
one or more computer processors;
one or more computer readable storage media; and
program instructions stored on the computer readable storage media for execution by at least one of the one or more processors, the program instructions comprising:
program instructions to capture a change to a record object, wherein the change includes details of the record object to be changed and a change method instruction by which the record object is to be changed, wherein the record object is immutable;
program instructions to store a change object as a standalone object including the change method instruction, a description of a reason for the change, and metadata pointing to the record object;
program instructions to modify metadata of all previous versions of the record object to include a pointer to the change object; and
program instructions to apply the change method instruction to the record object when responding to a retrieve or restore request for the record object.

16. The computer system of claim 15:
wherein program instructions to capture a change to a record object further comprise program instructions to capture a description of a reason for the change; and
wherein program instructions to store the change object as a standalone object further comprise program instructions to store the description in the change object.

17. The computer system of claim 15, further comprising program instructions, stored on the computer readable storage media for execution by at least one of the one or more processors, to:
store a series of interdependent change objects to accommodate multiple changes to a record object over time, wherein interdependent change objects include metadata with pointers to dependent change objects.

18. The computer system of claim 15, further comprising program instructions, stored on the computer readable storage media for execution by at least one of the one or more processors, to:
receive a request for a record object; and
apply one or more change method instructions to the record object by iterating through applicable change method instructions of one or more change objects pointed to by the record object metadata.

19. The computer system of claim 15, further comprising program instructions, stored on the computer readable storage media for execution by at least one of the one or more processors, to:
receive a request for a record object;
notify a user making the request that one or more changes to the record object are available; and
apply a change method instruction of one or more change objects pointed to by the record object according to a user selection.

20. The computer system of claim 15, further comprising program instructions, stored on the computer readable storage media for execution by at least one of the one or more processors, to:
receive a request for a record object; and
enforce application of change method instructions of one or more change objects pointed to by the record object metadata by default.

* * * * *